(12) United States Patent
Distefano et al.

(10) Patent No.: US 11,725,428 B2
(45) Date of Patent: *Aug. 15, 2023

(54) POWER ACTUATOR WITH SELF DISENGAGING CLUTCH UNIT

(71) Applicant: Magna Closures Inc., Newmarket (CA)

(72) Inventors: John Distefano, Richmond Hill (CA); Csaba Szente, Newmarket (CA); Ilya Neyman, Thornhill (CA)

(73) Assignee: MAGNA CLOSURES INC., Newmarket (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,176

(22) Filed: Oct. 11, 2021

(65) Prior Publication Data

US 2022/0025679 A1 Jan. 27, 2022

Related U.S. Application Data

(63) Continuation of application No. 16/421,865, filed on May 24, 2019, now Pat. No. 11,168,497.

(Continued)

(51) Int. Cl.
*E05B 81/20* (2014.01)
*F16H 19/00* (2006.01)
(Continued)

(52) U.S. Cl.
CPC ............. *E05B 81/20* (2013.01); *E05B 79/12* (2013.01); *E05B 79/20* (2013.01); *E05B 81/06* (2013.01);
(Continued)

(58) Field of Classification Search
CPC .......... E05B 79/12; E05B 79/20; E05B 81/06; E05B 81/16; E05B 81/20; E05B 81/25;
(Continued)

(56) References Cited

U.S. PATENT DOCUMENTS

| 4,257,634 A | 3/1981 | Kleefeldt et al. |
| 5,046,377 A | 9/1991 | Wilkes et al. |

(Continued)

FOREIGN PATENT DOCUMENTS

| CN | 101368602 A | 2/2009 |
| CN | 201460486 U | 5/2010 |

(Continued)

*Primary Examiner* — Richard M Lorence
(74) *Attorney, Agent, or Firm* — Dickinson Wright PLLC

(57) ABSTRACT

A power actuator for a latch of a motor vehicle closure panel has an electric motor to rotate a lead screw about an axis. A nut is disposed about the lead screw for selective translation along the lead screw. A clutch plate is configured for selective rotation about the axis when engaged with the nut, with a biasing member biasing the nut out of engagement with the clutch plate when the electric motor is de-energized. A carrier member is coupled with the nut to cause the nut to translate into engagement with the clutch plate during rotation of the lead screw, whereupon the nut and carrier member co-rotate with the clutch plate and leadscrew. A driven member is operably coupled with the clutch plate and with the latch via a cable/rod, such that the driven member maintains the latch in a cinched state when the electric motor is energized.

20 Claims, 13 Drawing Sheets

Related U.S. Application Data

(60) Provisional application No. 62/677,343, filed on May 29, 2018.

(51) Int. Cl.

| | | |
|---|---|---|
| *F16H 1/20* | (2006.01) | |
| *F16D 11/14* | (2006.01) | |
| *F16D 23/12* | (2006.01) | |
| *F16C 1/12* | (2006.01) | |
| *E05B 81/06* | (2014.01) | |
| *E05B 81/16* | (2014.01) | |
| *E05B 81/40* | (2014.01) | |
| *E05B 81/46* | (2014.01) | |
| *E05B 79/20* | (2014.01) | |
| *E05B 79/12* | (2014.01) | |
| *F16H 25/20* | (2006.01) | |

(52) U.S. Cl.
CPC .............. *E05B 81/16* (2013.01); *E05B 81/40* (2013.01); *E05B 81/46* (2013.01); *F16C 1/12* (2013.01); *F16D 11/14* (2013.01); *F16D 23/12* (2013.01); *F16H 1/203* (2013.01); *F16H 19/001* (2013.01); *F16H 25/20* (2013.01); *E05Y 2900/546* (2013.01); *F16D 2023/123* (2013.01); *F16H 2025/2075* (2013.01)

(58) Field of Classification Search
CPC .......... E05B 81/34; E05B 81/40; E05B 81/46; F16D 11/14; F16D 23/12; F16D 2023/123; F16C 1/12; F16H 1/203; F16H 19/001; F16H 25/20; F16H 2025/2075; Y10T 292/1082; Y10S 292/23

See application file for complete search history.

(56) References Cited

U.S. PATENT DOCUMENTS

| | | | |
|---|---|---|---|
| 5,628,535 A | | 5/1997 | Buscher et al. |
| 5,673,593 A | | 10/1997 | Lafferty |
| 6,637,571 B2 | | 10/2003 | Arnold et al. |
| 6,715,806 B2 | | 4/2004 | Arlt et al. |
| 7,007,780 B2 | | 3/2006 | Arnold et al. |
| 8,991,582 B2 | | 3/2015 | Eguchi et al. |
| 10,443,289 B2 | | 10/2019 | Rrumbullaku et al. |
| 11,168,497 B2 | * | 11/2021 | Distefano ............... E05B 79/20 |
| 2004/0004357 A1 | | 1/2004 | Arlt et al. |
| 2005/0230212 A1 | | 10/2005 | Kossett |
| 2009/0152072 A1 | | 6/2009 | Kossett |
| 2011/0308341 A1 | | 12/2011 | Mullins, III et al. |
| 2017/0074382 A1 | | 3/2017 | Larson |
| 2017/0247933 A1 | | 8/2017 | Elie et al. |

FOREIGN PATENT DOCUMENTS

| | | |
|---|---|---|
| CN | 102322184 A | 1/2012 |
| CN | 102345421 A | 2/2012 |
| CN | 202627698 U | 12/2012 |
| CN | 104565101 A | 4/2015 |
| CN | 206617522 U | 11/2017 |
| DE | 102004004381 B4 | 7/2006 |
| DE | 102010023398 B4 | 2/2015 |
| WO | 2006029087 A1 | 3/2006 |
| WO | 2017083706 A1 | 5/2017 |
| WO | 2021155359 A1 | 8/2021 |

* cited by examiner

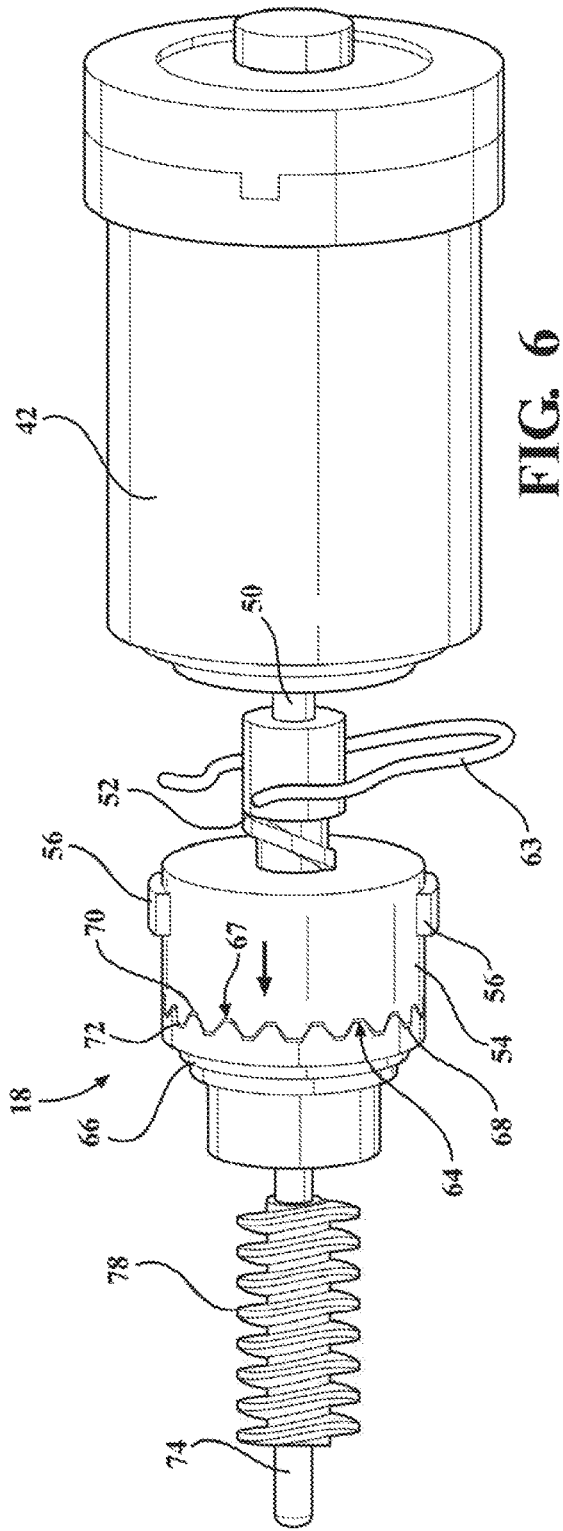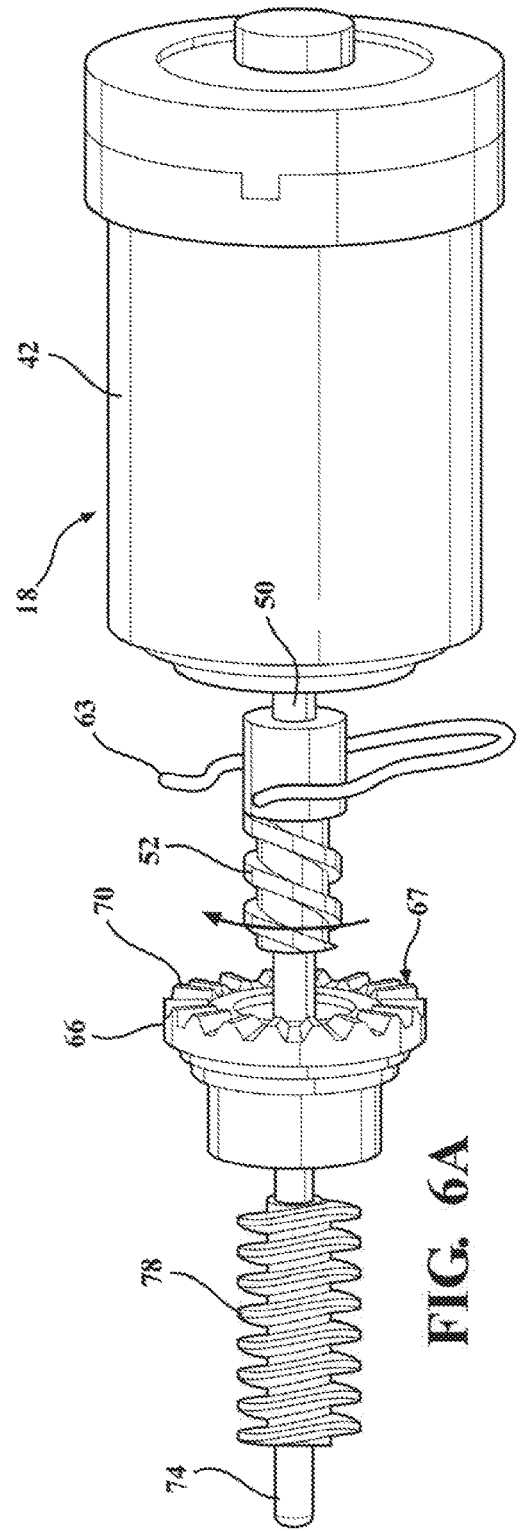

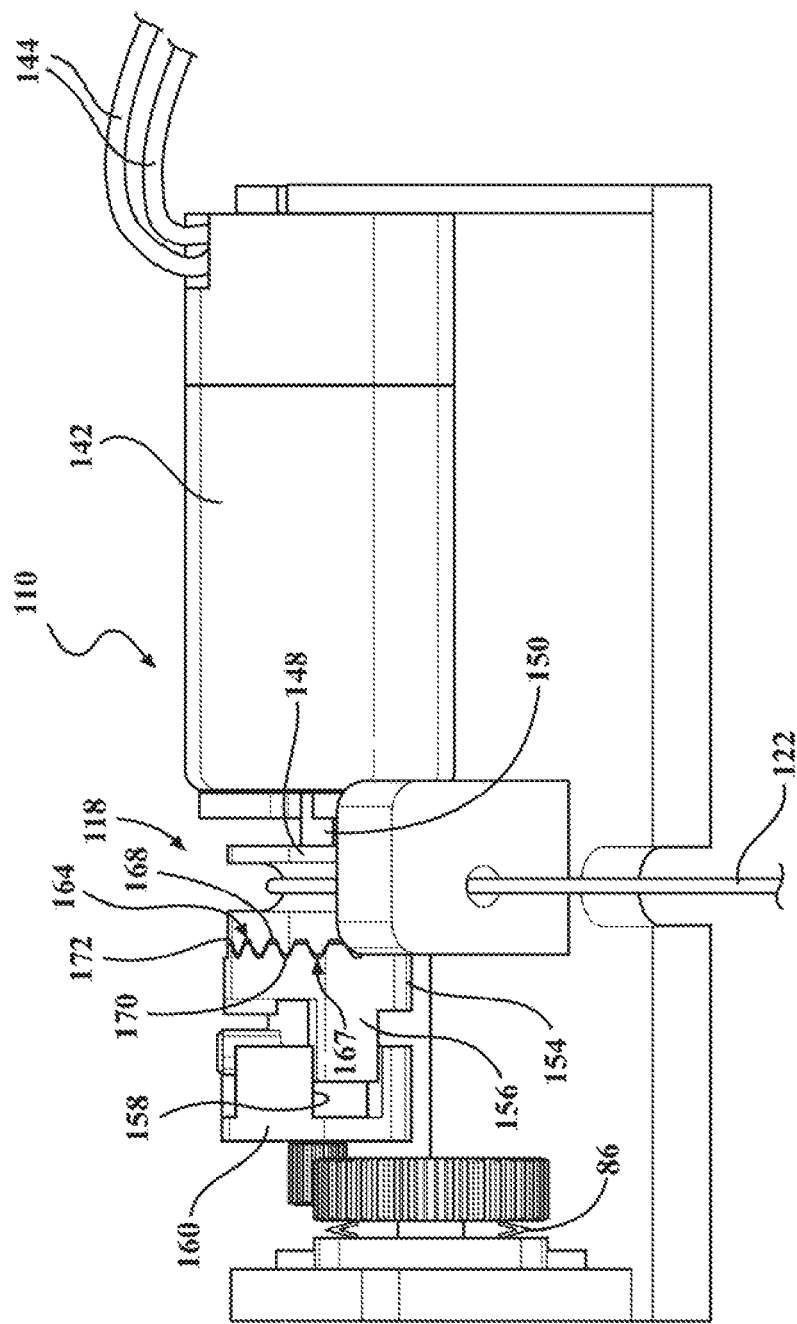

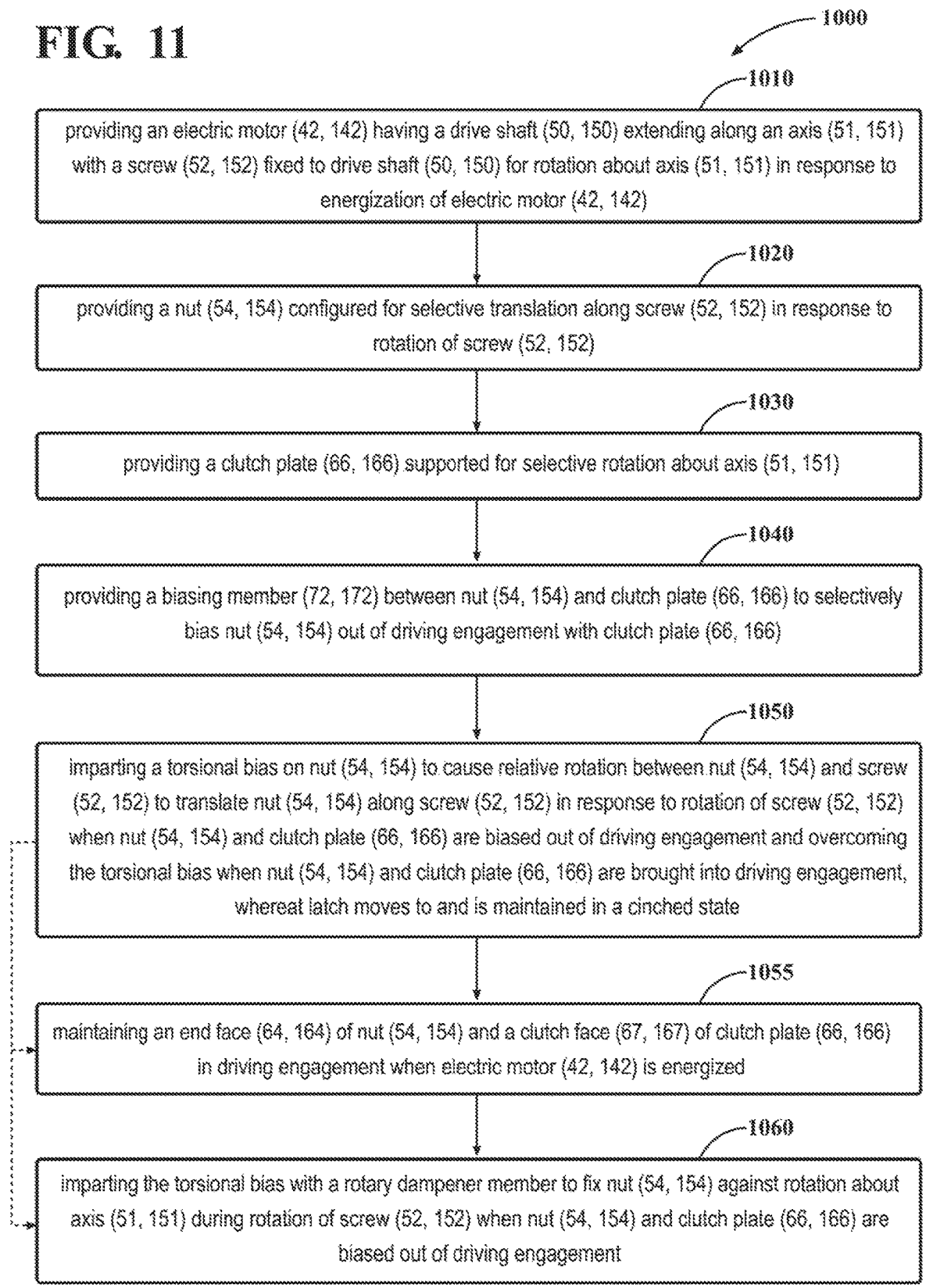

POWER ACTUATOR WITH SELF DISENGAGING CLUTCH UNIT

CROSS-REFERENCE TO RELATED APPLICATION

This application is a continuation of U.S. patent application Ser. No. 16/421,865, filed on May 24, 2019, which claims the benefit of U.S. Provisional Application Ser. No. 62/677,343, filed May 29, 2018, which are both incorporated herein by reference in their entirety.

FIELD

The present disclosure relates generally to clutch assemblies, and more particularly to self-disengaging clutch assemblies for vehicle closure panels.

BACKGROUND

This section provides background information related to vehicle closure panels and clutch assemblies therefor to provide a better understanding of currently available configurations and adaptations of such vehicle closure panels and clutch assemblies. However, the information provided in this section is not necessarily considered to be prior art with respect to the inventive concepts associated with the present disclosure.

Actuators are often used in automotive vehicles to cinch a latch of a vehicle closure panel. Such actuators typically include a motor and gear assembly operably coupled to the latch via a cable or rod. Commonly, the motor and gear assembly of the actuator are operably coupled to one another for selective coupled engagement to transfer torque from the motor to the gear assembly and for selective decoupled relation with one another to prevent the transfer of torque between the motor and the gear assembly. Known clutch assemblies typically rely on a speed of the motor to bring the motor into and out of coupled engagement with the gear assembly, wherein when the motor is rotating below the speed, the motor is decoupled from the gear assembly, thereby allowing the gear assembly to rotate freely relative to the motor, and wherein when the motor is rotating above the speed, the motor is coupled with the gear assembly, thereby allowing the gear assembly to be driven in response to rotation of the motor. Although the speed-based clutch assemblies can prove effective in selectively transferring torque between the motor and the gear assembly, they come with some potential drawbacks.

Some drawbacks of speed-based clutch assemblies to transfer torque between a motor and a gear assembly include the need to attain and sustain a minimum speed in order to maintain the clutch assembly in an operably coupled, engaged state, which means the clutch assembly cannot remain engaged if the speed falls below the predetermined minimum speed. Accordingly, if the motor speed and/or output shaft/member is operating below the minimum required speed, including in a "stall" condition, though power is present, the clutch assembly is effectively disengaged, thereby allowing the gear assembly to rotate freely relative to the output shaft/member, even if not desired. Further yet, causing actuation of the clutch assembly in response to a speed condition can prove challenging to make reliable and predictable, due at least in part to inherent variances within the clutch assembly. As such, engagement and disengagement in response to a speed condition can come with inherent variances, which ultimately can cause the clutch assembly to engage and disengage over a range of speed rather than at a precise speed, thereby imparting variance within the system.

Thus, for at least those reasons discussed above, a need exists to develop optimized closure panel assemblies and actuators/clutch assemblies therefor.

SUMMARY

This section provides a general summary of some of the objects, advantages, aspects and features provided by the inventive concepts associated with the present disclosure. However, this section is not intended to be considered an exhaustive and comprehensive listing of all such objects, advantages, aspects and features of the present disclosure.

In one aspect, the present disclosure is directed to a vehicle closure panel and a clutch assembly for the vehicle closure panel which advances the art and improves upon currently known vehicle closure panels and clutch assemblies for such vehicle closure panels.

In another aspect, the present disclosure is directed to a vehicle closure panel and a cinch actuator for the vehicle closure panel which advances the art and improves upon currently known vehicle closure panels and cinch actuators for such vehicle closure panels.

It is a related aspect to provide a cinch actuator with a clutch assembly that is engaged and disengaged in response to electrical energy in reliable, economical fashion.

It is a related aspect to provide a cinch actuator with a clutch assembly that can remain engaged during all torque conditions, including a stall condition, thereby prevented unwanted disengagement of the cinch actuator.

It is a related aspect to provide a cinch actuator with a clutch assembly that is automatically disengaged upon the absence of electrical energy.

In accordance with these and other aspects, a power actuator for cinching a latch of a motor vehicle closure panel is provided, comprising: a housing; an electric motor supported by the housing, the electric motor having a drive shaft extending along an axis with a lead screw fixed to the drive shaft for rotation about the axis in a first direction in response to energization of the electric motor; a nut disposed about the lead screw, the nut having an end face and being configured for selective translation along the lead screw in response to rotation of the lead screw; a clutch plate disposed in the housing, the clutch plate having a clutch face and being configured for selective rotation about the axis; a biasing member imparting a bias between the nut and the clutch plate, the bias tending to space the end face out of driving engagement with the clutch face; a carrier member supported by the housing in coupled engagement with the nut, the carrier member imparting a torsional bias on the nut sufficient to cause selective relative rotation between the nut and the lead screw to cause the nut to translate along the lead screw in response to rotation of the lead screw when the end face of the nut and the clutch face of the clutch plate are biased out of driving engagement with one another, the torsion bias being overcome upon the end face of the nut and the clutch face of the clutch plate being brought into driving engagement with one another, thereby allowing the nut and the carrier member to rotate conjointly with the leadscrew; a driven member operably coupled with the clutch plate; and a cable/rod operably coupled to the driven member and to the latch, wherein the driven member actuates the cable/rod to cinch the latch when the end face of the nut and the clutch face of the clutch plate are brought into driving engagement with one another and when the lead screw is rotating in the first direction.

In accordance with another aspect of the disclosure, the end face of the nut and the clutch face of the clutch plate are maintained in driving engagement with one another when electrical energy is supplied to the electric motor, thereby inhibiting backdriving of the nut in a stall condition.

In accordance with another aspect of the disclosure, a rotary damper member is configured to impart a torsional bias on the carrier, the torsional bias fixing the carrier and the nut against rotation with the lead screw when the end face of the nut and the clutch face of the clutch plate are biased out of driving engagement with one another and allowing the carrier and the nut to rotate with the lead screw when the end face of the nut and the clutch face of the clutch plate are in driving engagement with one another.

In accordance with another aspect of the disclosure, the rotary damper can be provided as a spring member configured to impart a frictional bias on an outer surface of the carrier member.

In accordance with another aspect of the disclosure, the rotary damper can be provided to include a damper gear member configured in meshed engagement with a carrier gear member fixed to the carrier member.

In accordance with another aspect of the disclosure, the driven member can be operably coupled to the clutch plate, to be driven in response to rotation of the clutch plate, by a gear assembly, and further, the clutch plate can be fixed to an output shaft having a worm gear configured in meshed engagement with the gear assembly.

In accordance with another aspect of the disclosure, the drive shaft of the motor can be configured to rotate relative to the output shaft having the worm gear when the end face of the nut and the clutch face of the clutch plate are biased out of driving engagement with one another.

In accordance with another aspect of the disclosure, the drive shaft of the motor and the output shaft can be configured to co-rotate with one another when the end face of the nut and the clutch face of the clutch plate are in driving engagement with one another.

In accordance with another aspect of the disclosure, the clutch plate and the driven member can be permanently fixed to one another, and further yet, can be provided as a single component.

In accordance with another aspect of the disclosure, the clutch plate and the driven member can be supported by the drive shaft of the motor wherein the drive shaft can be configured to rotate relative to the clutch plate and the driven member when the end face of the nut and the clutch face of the clutch plate are biased out of driving engagement with one another.

In accordance with another aspect of the disclosure, the clutch plate and the driven member can be supported by the drive shaft of the motor wherein the clutch plate and the driven member can be configured to co-rotate with the drive shaft when the end face of the nut and the clutch face of the clutch plate are in driving engagement with one another.

In accordance with another aspect of the disclosure, one of the nut and the clutch plate can be provided having at least one drive lug and the other of the nut and the clutch plate having at least one recessed channel configured for sliding receipt of the at least one drive lug therein, the at least one drive lug being configured to translate within the at least one recessed channel when the electric motor is energized and when the end face of the nut and the clutch face of the clutch plate are biased out of driving engagement with one another, with the at least one drive lug and the at least one recessed being further configured to prevent relative rotation between the carrier member and the nut when the end face of the nut and the clutch face of the clutch plate are in driving engagement with one another.

In accordance with a further aspect of the disclosure, a motor vehicle door assembly is provided. The motor vehicle door assembly includes a door panel with a latch assembly fixed to the door panel and a cinch actuator carried by the door panel. The cinch actuator includes an electric motor having a drive shaft extending along an axis with a screw fixed to the drive shaft for rotation about the axis in response to energization of the electric motor. A nut is disposed about the screw. The nut has an end face and is configured for selective translation along the screw in response to rotation of the screw. A clutch plate having a clutch face is supported for selective rotation about the axis. A biasing member imparts a bias between the nut and the clutch plate, with the bias tending to space the end face out of driving engagement with the clutch face. A carrier member is supported in coupled relation with the nut. The carrier member imparts a torsional resistance on the nut sufficient to cause selective relative rotation between the nut and the screw to cause the nut to translate along the screw in response to rotation of the screw when the end face of the nut and the clutch face of the clutch plate are biased out of driving engagement with one another. The torsional resistance is overcome upon the end face of the nut and the clutch face of the clutch plate being brought into driving engagement with one another, whereat the nut and the carrier member rotate conjointly with the screw. A driven member is operably coupled with the clutch plate and at least one of a cable and rod operably couple the driven member with the latch assembly. The driven member drives the at least one cable and rod to cinch the latch assembly when the end face of the nut and the clutch face of the clutch plate are brought into driving relation with one another and when the screw rotates about the axis in response to energization of the electric motor.

In accordance with a further aspect of the disclosure, a method for placing and/or maintaining a latch of a motor vehicle closure panel in a cinched state is provided. The method includes providing an electric motor having a drive shaft extending along an axis with a screw fixed to the drive shaft for rotation about the axis in response to energization of the electric motor. Further, providing a nut having an end face and configuring the nut for selective translation along the screw in response to rotation of the screw. Further yet, providing a clutch plate having a clutch face and supporting the clutch plate for selective rotation about the axis. Further yet, providing a biasing member between the nut and the clutch plate to bias the end face of the nut out of driving engagement with the clutch face of the clutch plate. Further, providing a carrier member to impart a torsional resistance on the nut sufficient to cause selective relative rotation between the nut and the screw, thereby causing the nut to translate along the screw in response to rotation of the screw when the end face of the nut and the clutch face of the clutch plate are biased out of driving engagement with one another, while allowing the torsion resistance to be overcome upon the end face of the nut and the clutch face of the clutch plate being brought into driving engagement with one another, whereat the nut and the carrier member rotate conjointly with the screw to bring and maintain the latch in a cinched state.

In accordance with a further aspect, the method can include maintaining the face of the nut and the clutch face of the clutch plate in driving engagement with one another when the electric motor is energized, thereby preventing the latch from inadvertently becoming uncinched.

In accordance with a further aspect, the method can include imparting a torsional bias on the carrier with a rotary dampener member to fix the carrier and the nut against rotation about the axis with the screw when the end face of the nut and the clutch face of the clutch plate are biased out of driving engagement with one another and overcoming the torsional bias when the end face of the nut and the clutch face of the clutch plate are in driving engagement with one another to cause the carrier and the nut to rotate about the axis with the screw.

In accordance with another aspect, there is provided a clutch assembly including a nut disposed about a screw fixed to a drive shaft rotatably driven in response to energization of an electric motor, the nut having an end face and being configured for selective translation along the screw in response to rotation of the screw, a clutch plate having a clutch face and being configured for selective rotation, a damper member imparting a torsional bias on the nut sufficient to cause selective relative rotation between the nut and the screw to cause the nut to translate along the screw towards the clutch plate in response to rotation of the screw when the nut and the clutch plate are out of driving relation with one another, the torsional bias being overcome upon the nut and the clutch plate being brought into driving relation with one another, thereby allowing the nut to rotate conjointly with the screw, and an output member coupled with the clutch plate and being configured to be driven when the end face of the nut and the clutch face of the clutch plate are brought into driving relation with one another and when the screw rotates about the axis in response to energization of the electric motor.

In accordance with another illustrative embodiment, there is provided a method of operating an actuator, including the steps of energizing an electric motor having a drive shaft with a screw fixed to the drive shaft for rotation in response to energization of the electric motor, translating a nut having an end face along the screw towards a clutch face of a clutch plate in response to rotation of the screw and the end face and the clutch face being out of driving relation with one another, and rotating the clutch plate and the nut with the screw upon the end face of the nut and the clutch face of the clutch plate being in driving relation with one another to drive an output member coupled to the clutch plate when the electric motor is energized.

In accordance with another illustrative embodiment, there is provided a power actuator for cinching a latch of a motor vehicle closure panel, including a housing, an electric motor supported by said housing, said electric motor having a drive shaft extending along an axis with a screw fixed to said drive shaft for rotation about said axis in response to energization of said electric motor, a clutch plate having a clutch face and being configured for selective rotation about said axis, a nut disposed about said screw, said nut having an end face and being configured for selective translation along said screw in response to rotation of said screw, said nut to translate along said screw in response to rotation of said screw when said end face of said nut and said clutch face of said clutch plate are out of driving relation with one another, said nut to rotate conjointly with said screw upon said end face of said nut and said clutch face of said clutch plate being brought into driving relation with one another, and a driven member operably coupled with said clutch plate and being configured to cinch the latch when said end face of said nut and said clutch face of said clutch plate are brought into driving relation with one another and when said screw rotates about said axis in response to energization of said electric motor.

Further areas of applicability will become apparent from the description provided herein. As noted, the description and any specific examples in this summary are intended for purposes of illustration only and are not intended to limit the scope of the present disclosure.

BRIEF DESCRIPTION OF THE DRAWINGS

Other advantages of the present embodiments will be readily appreciated, as the same becomes better understood by reference to the following detailed description and appended claims when considered in connection with the accompanying drawings, wherein:

FIG. 6 is a perspective view of the clutch assembly as shown in FIG. 5;

FIG. 6A is a view similar to FIG. 6 with a drive nut removed for clarity purposes only;

FIG. 8 is a representative model of a cinch actuator in accordance with another aspect of the disclosure;

FIG. 11 is a flow diagram illustrating a method of cinching a latch of a motor vehicle closure panel.

DETAILED DESCRIPTION OF EXAMPLE EMBODIMENTS

Figure 1:
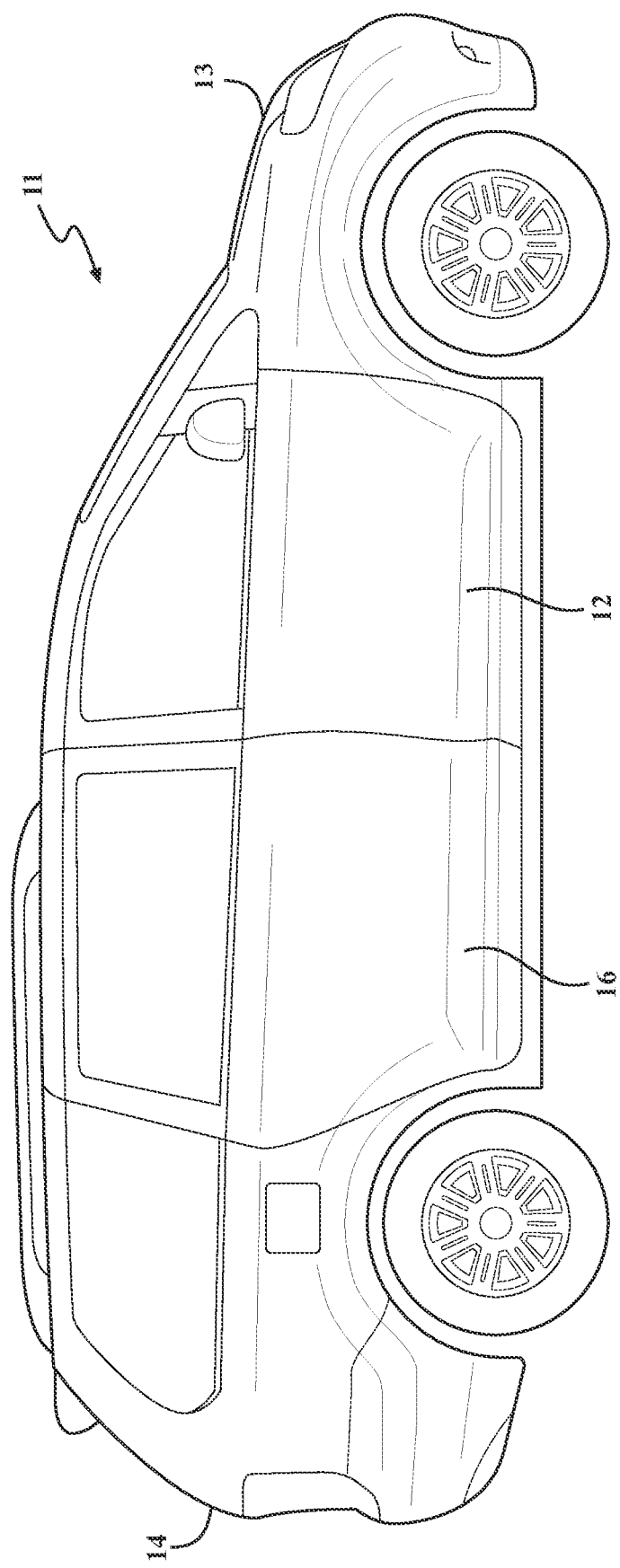
FIG. 1 illustrates a vehicle having at least one closure panel assembly constructed in accordance with one aspect of the disclosure.
Figure 2:
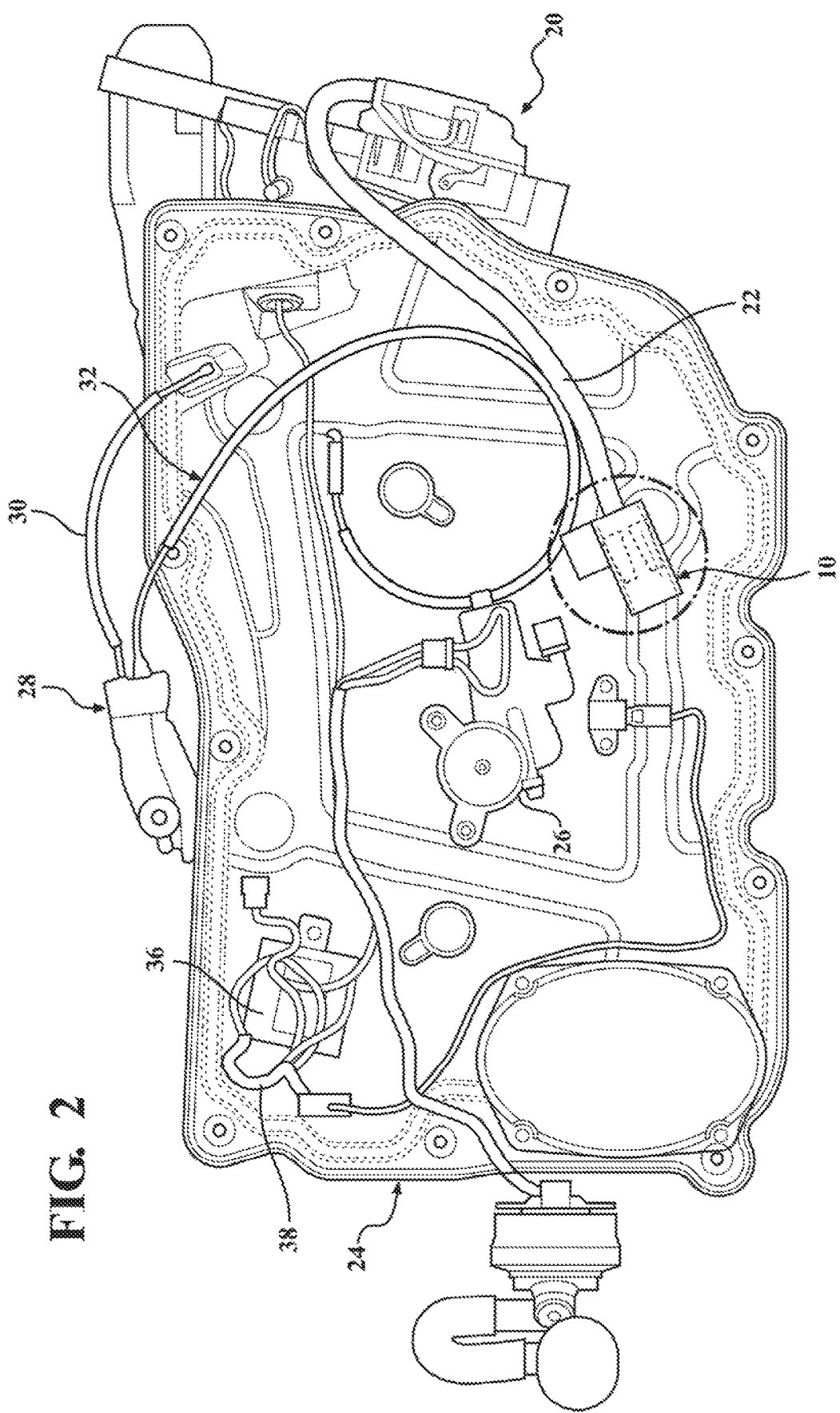
FIG. 2 is a plan view of a dry-side of a carrier assembly of a closure panel of the vehicle of FIG. 1 showing a cinch actuator fixed thereto with the cinch actuator being operably coupled to a latch to selectively cinch the latch.

The example embodiments will now be described more fully with reference to the accompanying drawings.

One or more example embodiments of a closure panel, illustrated as a vehicle door having a door module and a power actuator having a clutch unit, also referred to as clutch assembly, are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 shows a motor vehicle 11 having a plurality of closure panel assemblies moveable between open and closed, cinched positions, including front door panel assemblies 12, a rear hatch lift gate closure panel assembly 14, a front hood or frunk 13, at least one sliding side door panel assembly 16, wherein one or more of the panel assemblies can have a cavity configured for receipt of a power actuator, also referred to as cinch actuator 10, having a clutch unit, also referred to as clutch assembly 18 (FIGS. 3-7A), constructed in accordance with one aspect of the disclosure. Cinch actuator 10 may be received or house within other cavities, such as within a cavity of the vehicle body and/or at other locations provided in the vehicle 11. Illustratively, the term cinch is used herein to describe a powered movement of the closure panel assembly 14 from an opened position of the closure panel assembly 14 to a closed position of the closure panel assembly 14. For example, such a powered movement of the closure panel assembly 14 may include a powered movement from partially opened position of the closure panel assembly 14 corresponding to a secondary latched state of the latch assembly 20, to a closed position of the closure panel assembly 14 corresponding to a primary latched state of the latch assembly 20. The clutch assembly and actuator configurations described herein may be employed for providing other types of powered movement of the closure panel assembly 14 and/or vehicle components. The cinch actuator 10 is configured in operable communication with a latch assembly 20, also received at least in part in the cavity of the panel assembly, via at least one of a rod or cable, such as a Bowden cable 22, by way of example and without limitation, to selectively communicate with and selectively (when commanded at a desired time) cinch the latch assembly 20. The power actuator 10 is shown, by way of example and without limitation, attached to a dry side of a carrier 24, wherein dry side is referred to as the "dry-side" because, when carrier 24 is installed in the vehicle closure panel, the carrier 24 seals the passenger compartment of the motor vehicle 11 against the ambient external environment such that the dry side, which faces toward the passenger compartment, is protected from the external environment and remains dry.

Carrier 24 holds a variety of functional door hardware components. Generally speaking, the functional hardware components secured to carrier 24 can, as shown, include, among other things, the power-operated latch assembly 20, a power-operated window regulator 26, an inside handle unit 28 mechanically coupled to latch assembly 20 via an inside release mechanism 30 and via an inside lock/unlock mechanism 32. The connector mechanisms can be Bowden cables and/or rod-links as is known. The functional hardware components are electrically coupled to an ECU 36, or an Electronic Control Unit, via a wiring harness 38.

Figure 3:
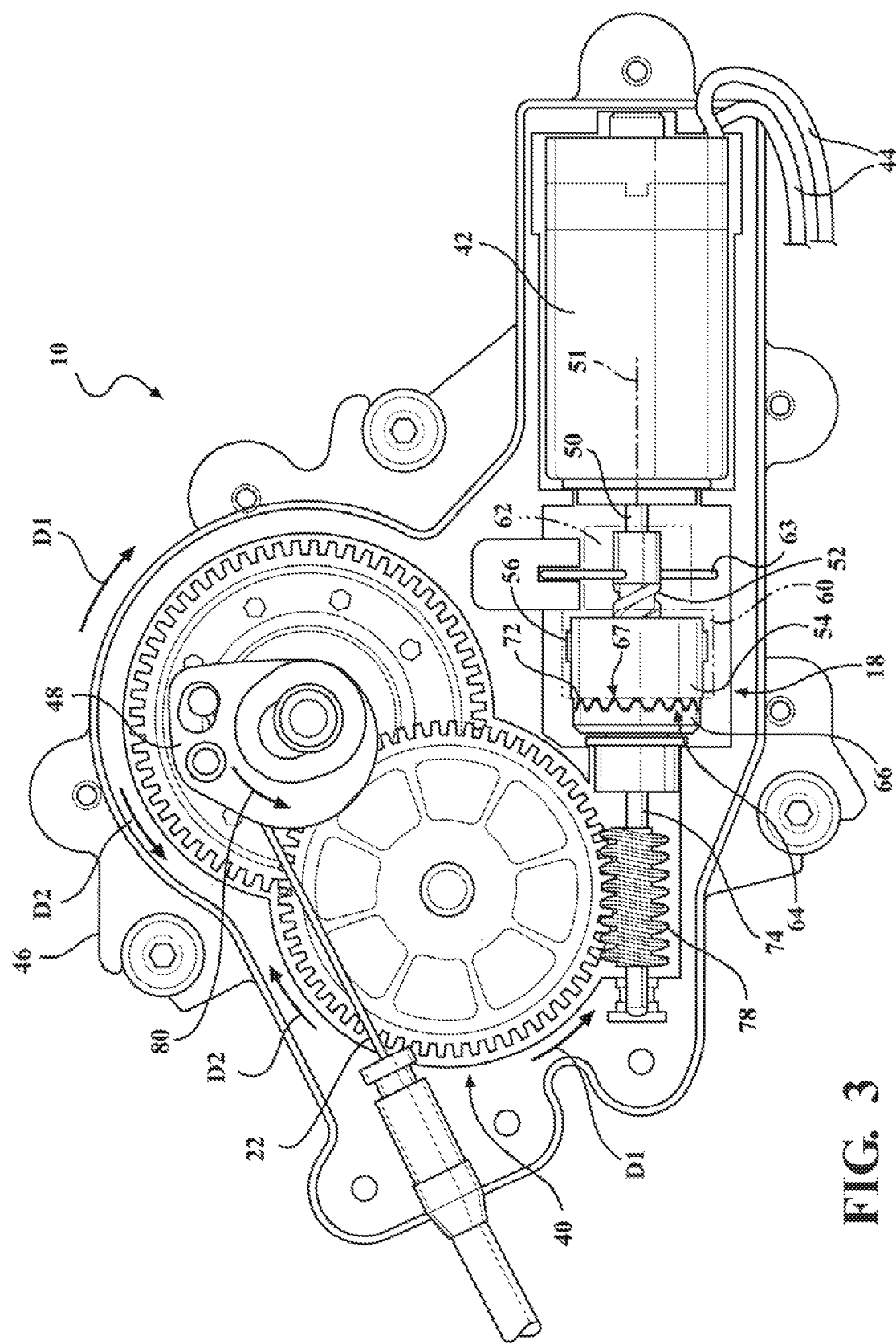
FIG. 3 is a plan view of the cinch actuator of FIG. 2 shown with a cover removed therefrom for clarity of internal components thereof.
Figure 4:
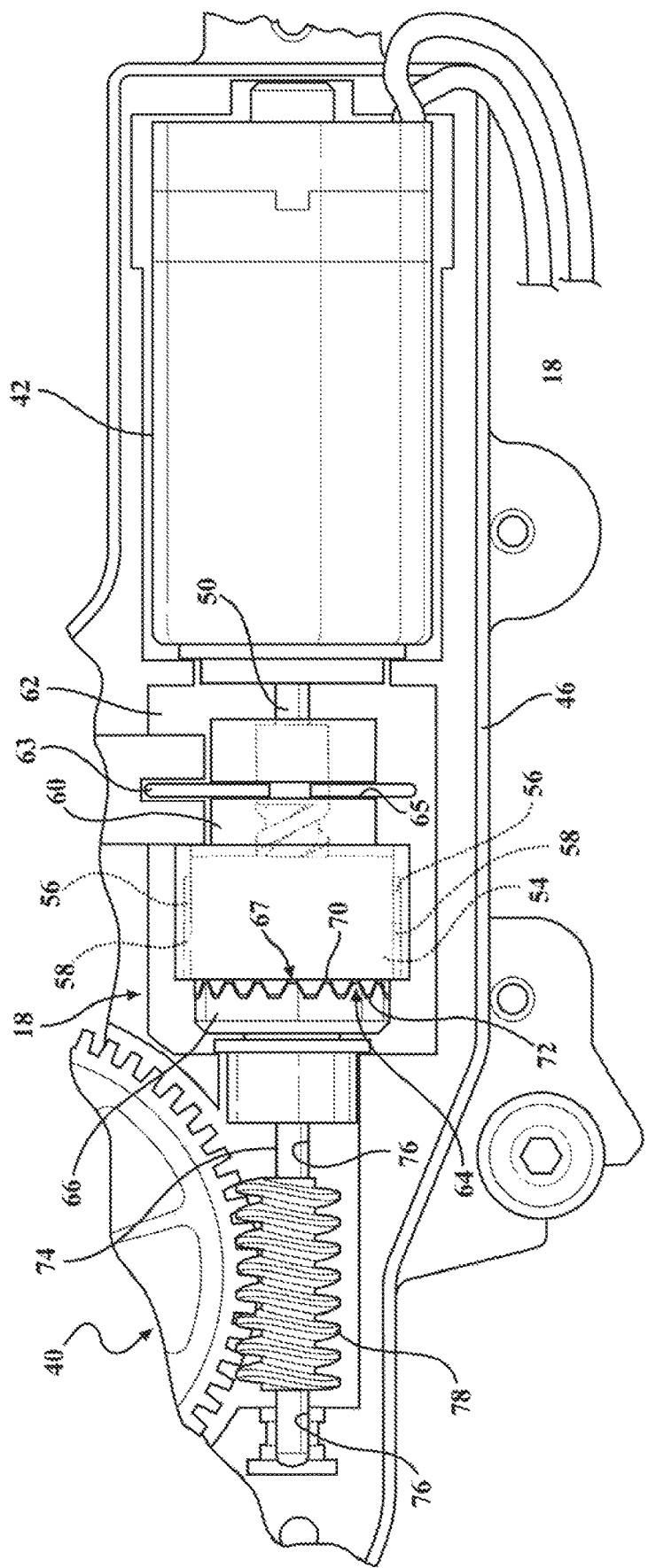
FIG. 4 is an enlarged partial view of a clutch assembly of the cinch actuator of FIG. 3.
Figure 5:
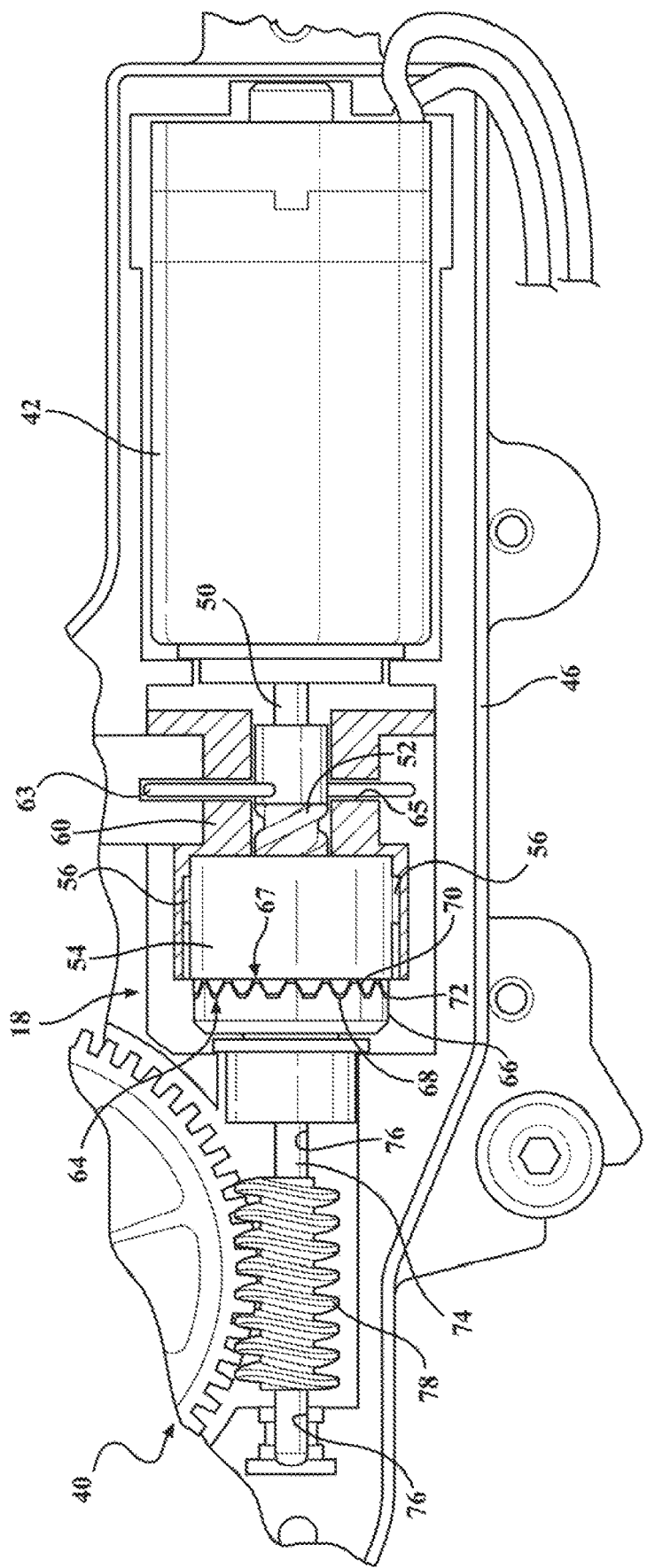
FIG. 5 is view similar to FIG. 4 with a carrier removed from the clutch assembly for clarity purposes only.

As shown in FIG. 3, the power actuator 10 includes the clutch assembly 18 and a gear assembly 40 configured for operable, selective communication with one another. The gear assembly 40, upon being driven in a first direction of rotation D1 by engaged clutch assembly 18 in response to selective energization of motor 42, is configured to drive cable 22 to cinch latch assembly 20 to a fully cinched state, and upon being allowed to return in a second direction of rotation D2 by disengaged clutch assembly 18 in response to de-energization of motor 42, is configured to release cable 22 to release latch assembly 20 from being cinched to an non-cinched state. Clutch assembly 18 is selectively actuatable (meaning intentionally actuated, whether via being manually actuated or via being automatically actuated, such as in response to a detected condition by a sensor and/or control module, for example) to move from a disengaged state, wherein the gear assembly 40 is out of operable driven communication with the clutch assembly 18 and from an electric motor, referred to hereafter as motor 42, to an engaged state, wherein the gear assembly 40 is in operable driven communication with the clutch assembly 18 and with the motor 42. Actuation of the clutch assembly 18 from the disengaged state to the engaged state is caused via electrical energy from electrical current supplied to the motor 42 of the clutch assembly 18, such as via electrical connection of wires 44 to any suitable source of electrical power provided in the vehicle 11, including a vehicle battery and/or alternator/generator, by way of example and without limitation.

The cinch actuator 10 has a housing 46 configured to receive and support the clutch assembly 18 and gear assembly 40. Gear assembly 40 can be provided as desired to attain the speed and torque output desired to act on, also referred to as drive, cable 22. Cable 22 is shown attached to or operably coupled to a driven member, also referred to as output lever 48, wherein output lever 48 is fixed for conjoint rotation with one of the gears of the gear assembly 40. Output lever 48 may include a cam for acting on cable 22, but other configurations are possible, for example output lever 48 may include a spool. It is contemplated that cable 22 could be operably coupled to driven member 48 via any suitable connection mechanism, including an adjustable coupler, if desired.

The motor 42 has a motor shaft 50 extending along an axis 51 and fixed to a drive member, shown as a screw, such as a lead screw 52. Lead screw 52 has one or more helical threads or grooves configured for mating threaded receipt with a corresponding number of mating helical threads or grooves in a bore of a nut 54. As such, as will be understood by a person possessing ordinary skill in the art of linear actuators and the like, rotation of the lead screw 52 causes linear translation of nut 54 therealong, as discussed further below. To facilitate driven translation of the nut 54 along lead screw 52, the nut 54 has at least one, and shown as a pair of diametrically opposed drive lugs 56 configured for sliding translation within a corresponding number of recessed guide tracks, also referred to as channels 58, of a carrier 60. The drive lugs 56 are configured for slightly loose, sliding receipt within the channels 58 to allow for linear translation therein, though the fit is close in a radial, rotational direction to prevent or inhibit relative rotation between the nut 54 and the carrier 60, thereby avoiding radial play, also referred to as slop, between nut 54 and carrier 60. The carrier 60 is received and supported in a cavity 62 of housing 46 and fixed against axial movement therein, thereby preventing carrier 60 from moving axially along drive shaft 50 within cavity 62; however, carrier 60 is permitted for selective rotation within the cavity 62. To facilitate selective rotation of carrier 60, a damper member, also referred to as rotary damper or biasing member, shown as a spring member, such as a spring clip 63, fixed in housing 46, by way of example and without limitation, is disposed in frictional engagement within a circumferentially extending groove 65 in an outer surface of carrier 60. It is to be recognized that the radial and/or torsional biasing force applied by spring clip 63 against carrier 60 can be precisely controlled via the spring force of spring clip 63, such that the selective rotation of the carrier 60 within cavity 62 can be precisely controlled and regulated in response to engagement of an end face 64 of nut 54 with an end face, also referred to as clutch face 67, of a clutch plate 66. Radial/torsional bias of spring clip 63, may be applied directly or indirectly to nut 54 for causing nut 54 to axially translate along a longitudinal axis of lead screw 52. For example, spring clip 63 may be configured to impart a radial/torsional bias directly on nut 54 while allowing nut 54 to axially move, that is spring clip 63 may be configured to provide a frictional radial/torsional bias on nut 54 and be configured to slide along an outer surface of nut 54 in accordance with an illustrative example. To facilitate selective conjoint driving interaction between end face 64 and clutch plate 66, end face 64 has a plurality of protrusions, also referred to as first teeth 68, configured for meshed driving operable interaction with protrusions, also referred to as second teeth 70, extending from clutch face 67 of clutch plate 66. A biasing member, such as a springy wave washer 72, such as those made of spring grade steel, is disposed between the end face 64 and clutch plate 66, wherein the wave washer 72 can be provided with a contour to mate, also referred to as nest, with the first and second teeth 68, 70. The wave washer 72 acts to bias the end face 64 and first teeth 68 of nut 54 axially away from the clutch plate 66 and second teeth 70 thereof while motor 42 is de-energized, and as discussed further below, while the wave washer 72 is axially compressed to allow the first and second teeth 68, 70 to be brought into operably engaged and/or driving relation with one another upon motor 42 being energized. Biasing member, for example wave washer 72, therefore illustratively imparts a bias on the nut 54 with the bias tending to space the nut 54, for example the end face 64 of the nut 54, out of driving engagement or relation with the clutch 66, for example out of driving engagement or relation with the clutch face 67.

Clutch plate 66 is fixed or coupled to an output shaft 74, an illustrative example of an output member, with output shaft 74 being separate and detached from motor shaft 50, with output shaft 74 being supported by bearing members 76 for driven rotation in response to clutch plate 66 being rotatably driven by nut 54. The output shaft 74 has a gear member, shown as a helical worm gear 78, by way of example and without limitation, configured in meshed relation with one of the gears of gear assembly 40. It will be understood that gear member 78 can be formed as a monolithic piece of material with output shaft 74, or formed separately from output shaft 74 and subsequently fixed thereto. As such, when clutch plate 66, output shaft 74 and worm gear 78 are conjointly rotated via driven interaction with end face 64 of nut 54, worm gear 78 drives gear assembly 40, which in turn acts on driven member 48 to cause driven member 48 to rotate or pivot, thereby driving and actuating cable 22 to cinch latch assembly 20. Accordingly, driven member 48 is configured in operably coupled relation with clutch plate 66 to effect actuation of cable 22 when desired to cinch latch assembly 20. Clutch assembly 18, 118 as described herein may be employed as part of other actuator types to drive or actuate different components of a closure panel or other vehicle component, for example clutch assembly 18, 118 may be employed as part of an actuator to move a window such as power-operated window regulator 26, or as part of an actuator to move a sliding door. For example, clutch plate 66 may be connected to an output member for driving a cable drum employed to spool and de-spool a cable used for moving a window or a sliding door. For example, clutch plate 66 may be connected to an output member for driving a rack pinion gear of a rack and pinion configuration employed to move a pivoting closure panel. Further, clutch assembly 18, 118 may be integrated within the vehicle component, for example clutch assembly 18, 118 may be integrated within the latch assembly 20 and may share a common housing of latch assembly 20.

In use, cinch actuator 10 is operable to move between a disengaged state and an engaged state in automatic response to being de-energized (no electrical current supplied to motor 42, thus producing the disengaged state) and energized (electrical current supplied to motor 42, thus producing the engaged state), respectively. While in the no electrical power, disengaged state, biasing member, such as wave washer 72, biases end face 64 and first teeth 68 thereon out of meshed, operable coupling with clutch plate 66 and second teeth 70 thereon, thereby automatically back-driving nut 54 axially away from engagement with clutch plate 66 without resistance from motor 42, thereby allowing latch assembly 20 to move to and/or remain in an un-cinched state, such as via influence from a biasing member illustrated schematically at 80, including a spring member or the like, acting on output lever 48 and/or elsewhere in latch assembly 20. Accordingly, when no electrical power is supplied to motor 42, cinch actuator 10 is automatically biased and driven to its disengaged state, wherein first and second teeth 68, 70 are decoupled and generally free to rotate relative with one another.

Figure 7:
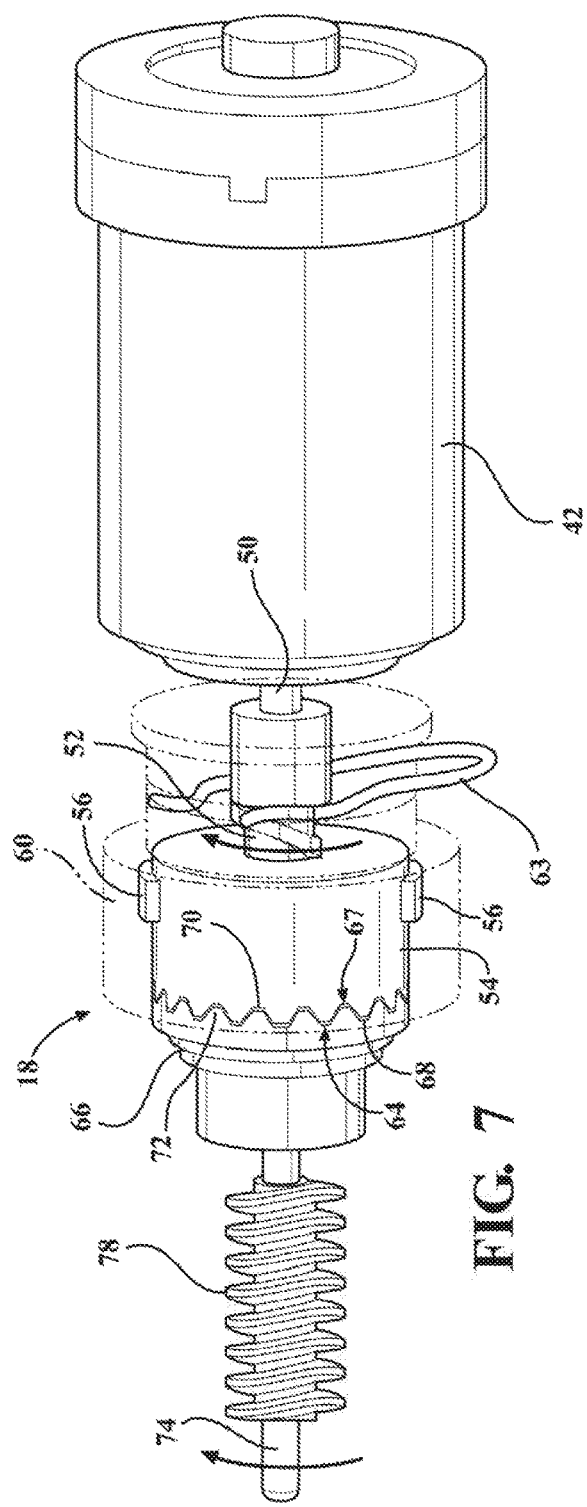
FIG. 7 is a perspective view of the clutch assembly as shown in FIG. 4 shown being driven in an engaged state.
Figure 7A:
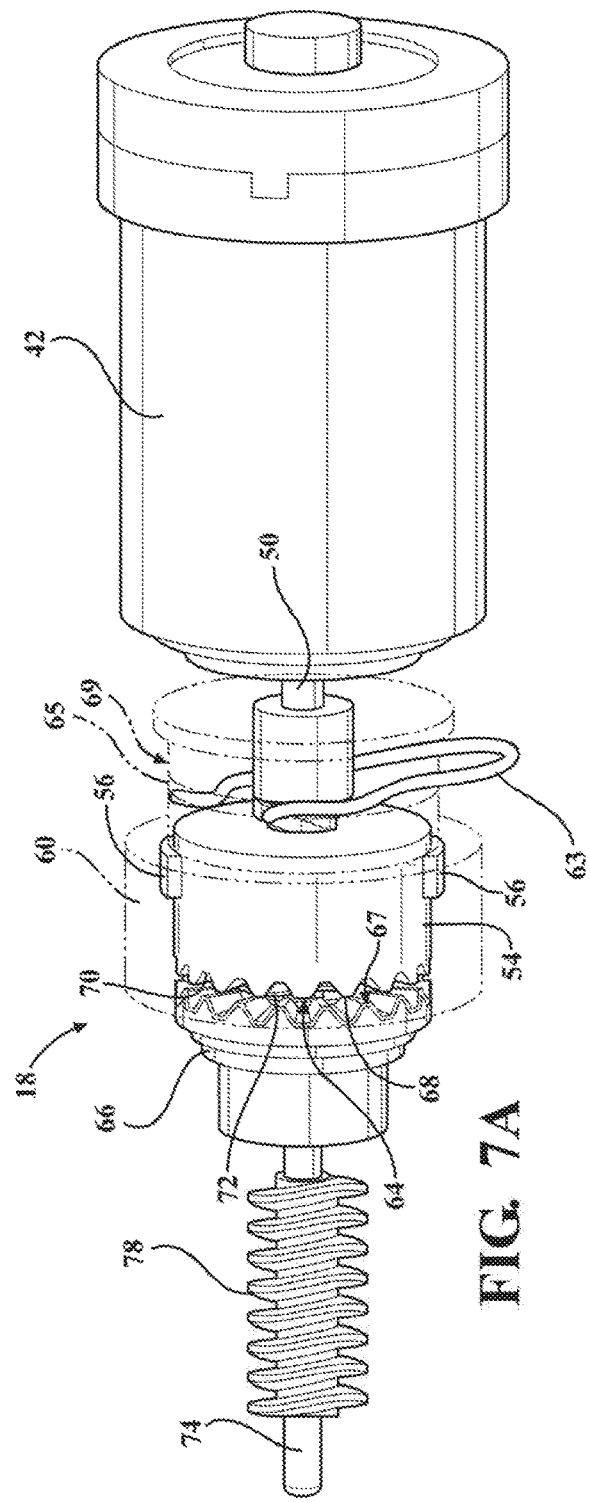
FIG. 7A is a view similar to FIG. 7 with the clutch assembly shown in an initial state of being disengaged.
Figure 7B:
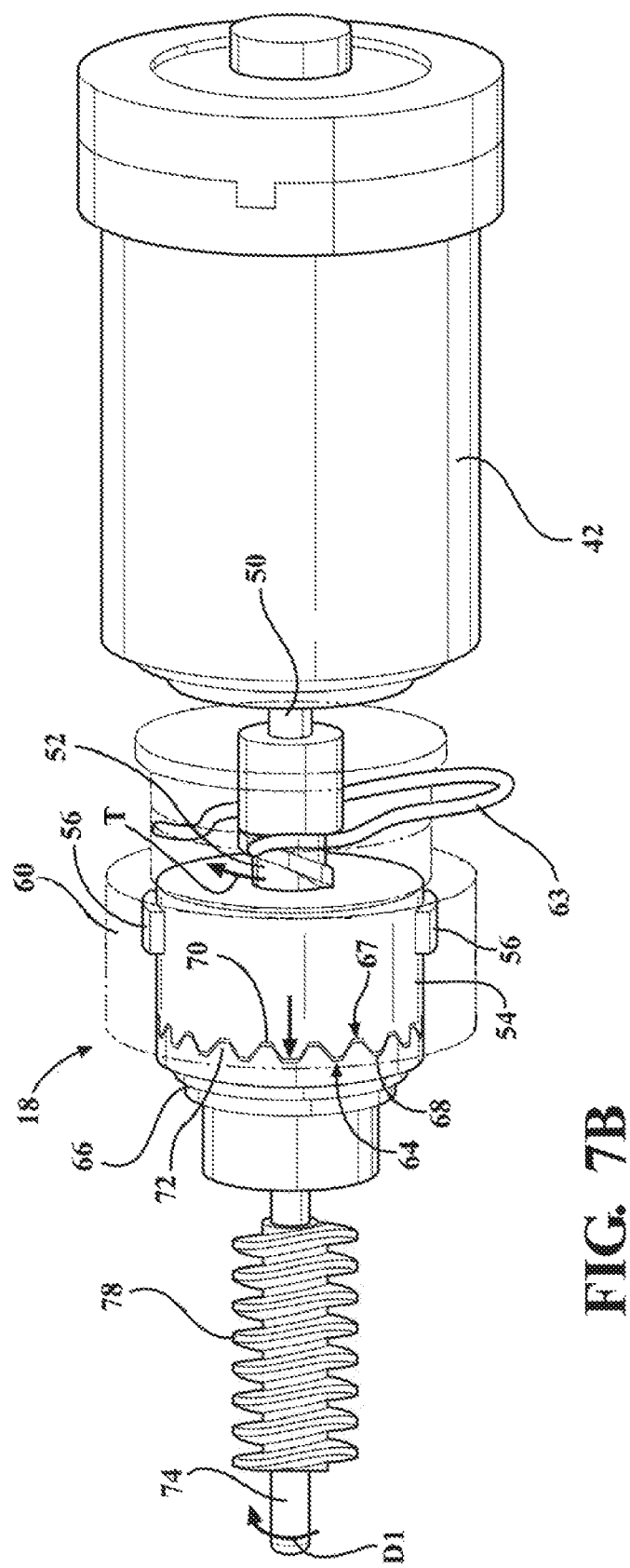
FIG. 7B is a view similar to FIG. 7 with the clutch assembly shown in a stall condition.
Figure 9:
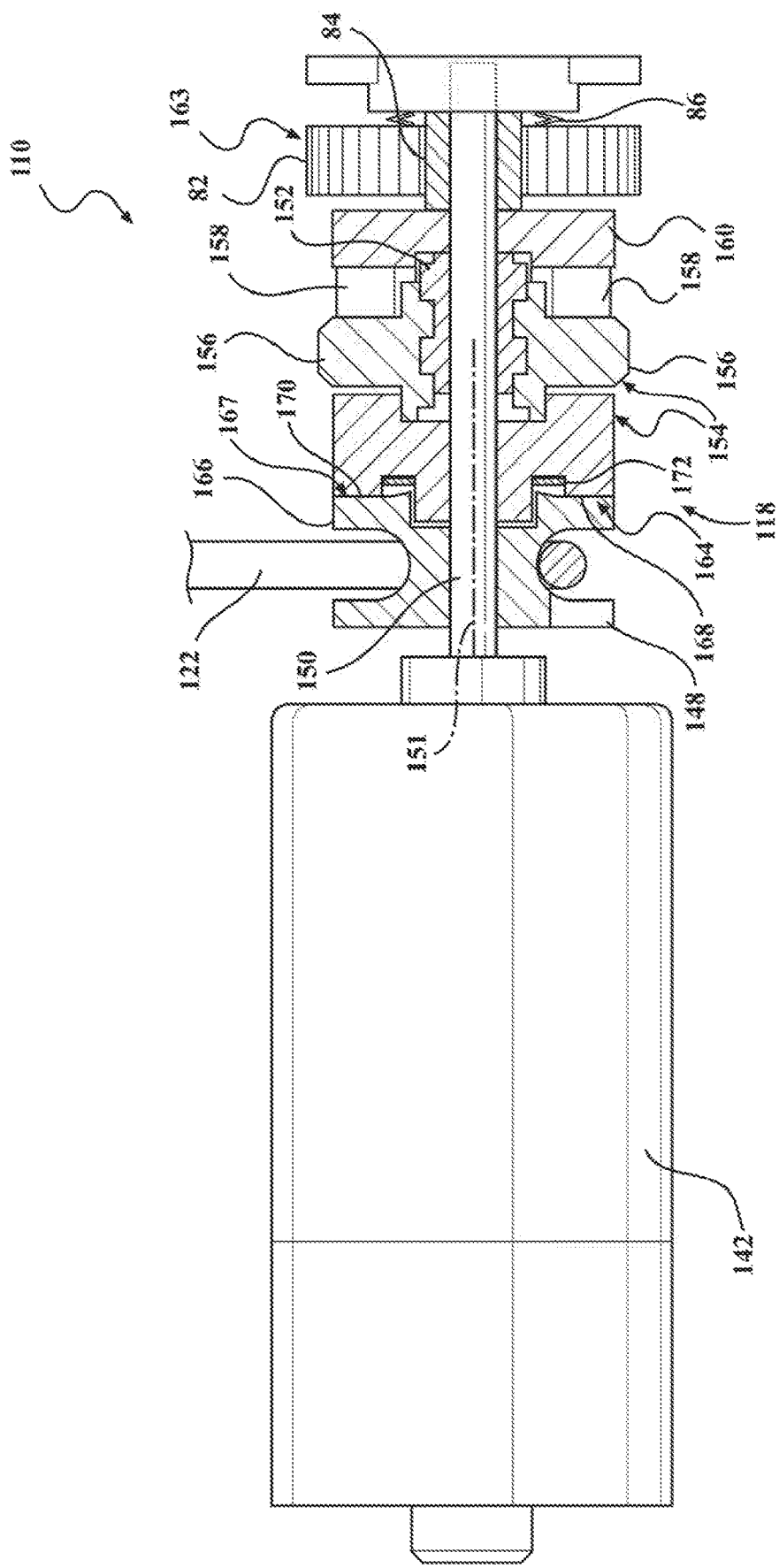
FIG. 9 is a partially cross-sectioned schematic side view of the cinch actuator of FIG. 8 shown in an engaged state.
Figure 10:
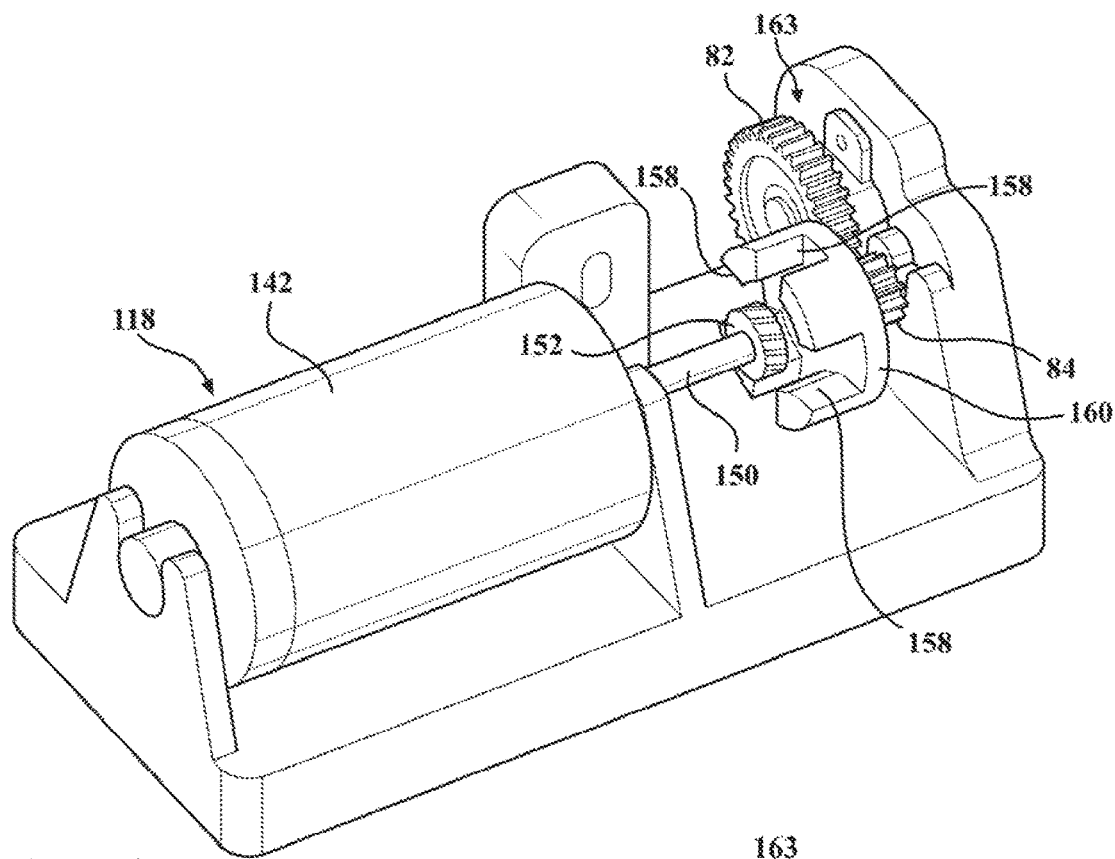
FIG. 10 is a schematic perspective view of the cinch actuator of FIG. 8 with a drive nut and drive pulley removed for clarity purposes only.
Figure 10A:
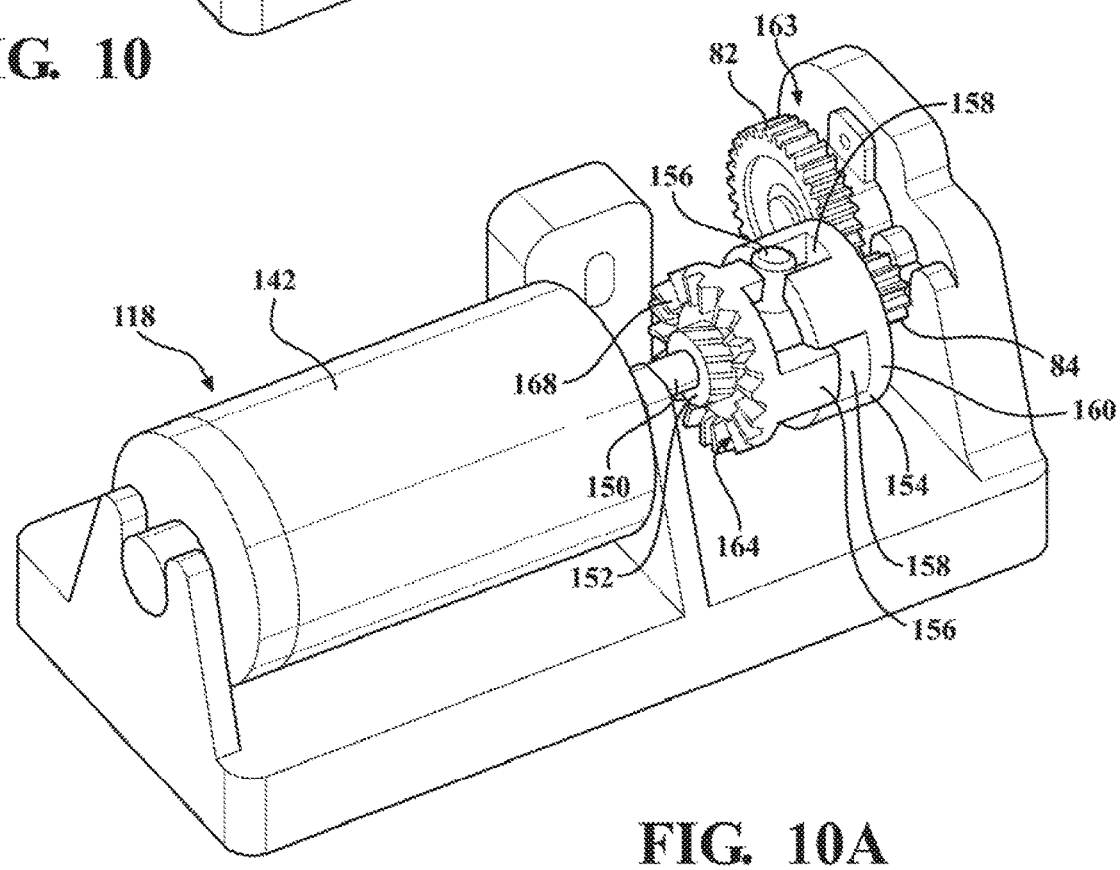
FIG. 10A is a view similar to FIG. 10 with the drive nut installed and shown being driven toward an engaged state.
Figure 10B:
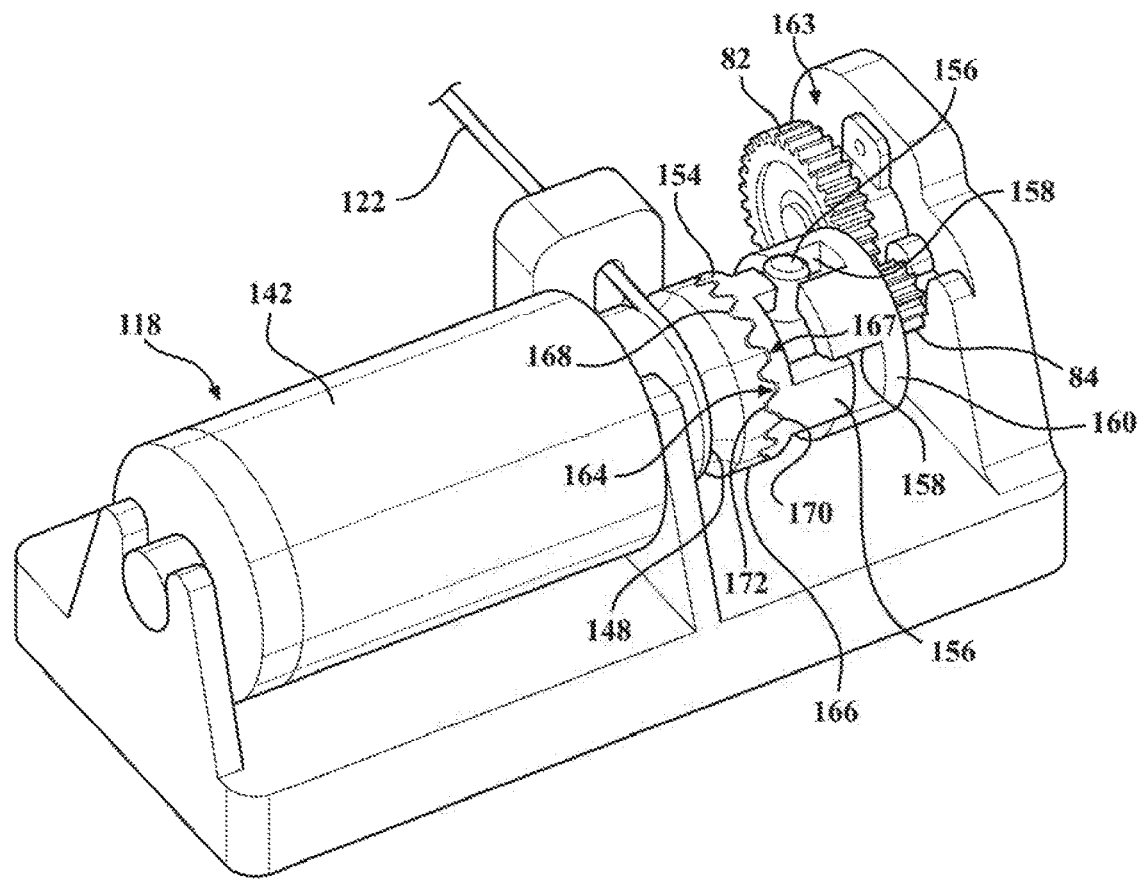
FIG. 10B is a view similar to FIG. 10A with the drive pulley installed and shown being driven by the drive nut.
Figure 10C:
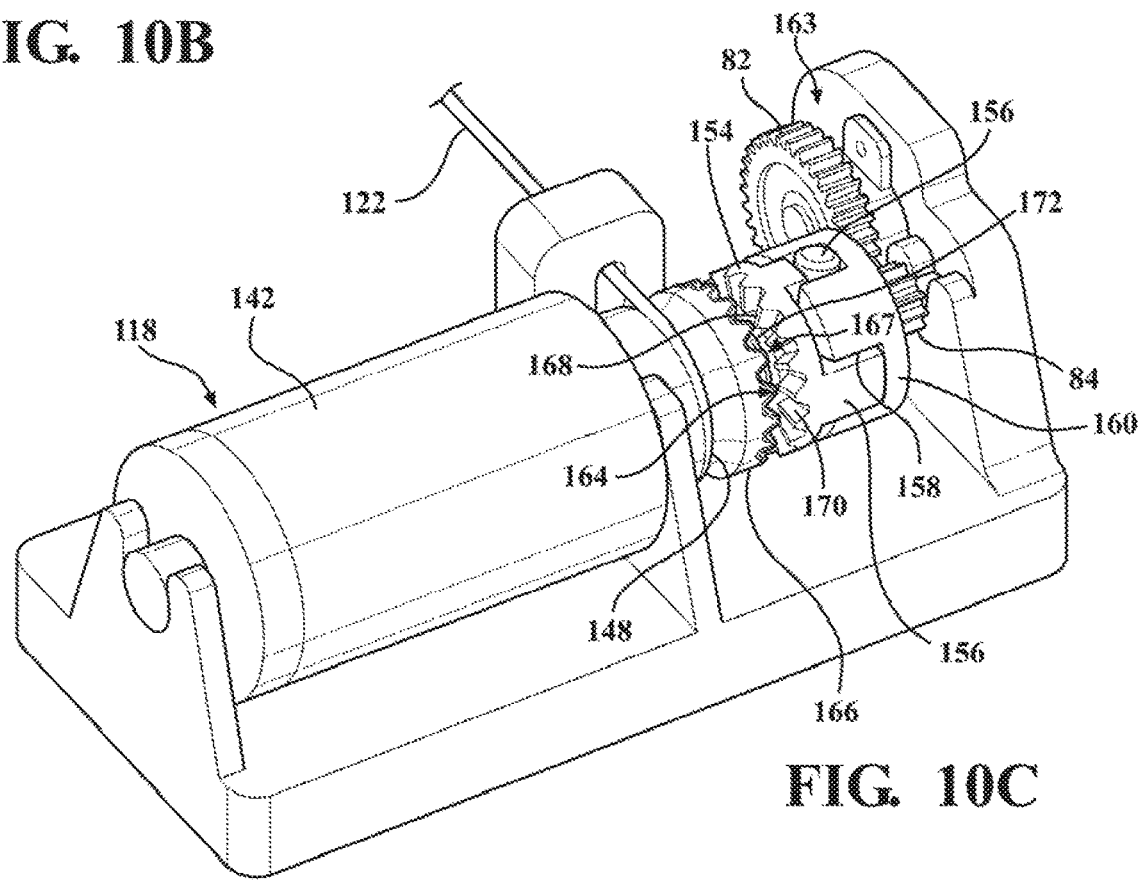
FIG. 10C is a view similar to FIG. 10B with the clutch assembly shown in an initial state of being disengaged.

When desired to move cinch actuator 10 to its engaged state, electrical power is selectively provided to motor 42 via wires 44, whereupon motor drive shaft 50 and lead screw 52 are rotated in a first driving direction, also referred to as actuating direction. Initial rotation of lead screw 52 causes nut 54 to translate axially along lead screw 52 with drive lugs 56 sliding axially within the recessed channels 58 of carrier 60. Up until the point where first and second teeth 68, 70 are operably coupled for driving engagement with one another, carrier 60 remains fixed against rotation under the radial/torsional bias of spring clip 63, thus, causing nut 54 to axially translate along a longitudinal axis of lead screw 52. Then, as the nut 54 translates sufficiently to overcome the bias of wave washer 72, the first and second teeth 68, 70 are brought into operably coupled, intermeshed (nested) relation with one another, with axially compressed wave washer 72 being sandwiched between nut 54 and carrier 60. When first and second teeth 68, 70 are operably engaged with one another, and wave washer 72 is full or substantially compressed (substantially compressed is intended to mean compressed sufficiently to allow first and second teeth 68, 70 to become intermeshed with one another), nut 54 is prevented from further axial translation as a result of clutch plate 66 and output shaft 74 being fixed against axial movement, whereupon sufficient torque is applied by drive lugs 56 of nut 54 to sidewalls of recessed channels 58 in carrier 60 to overcome the radial/torsional bias imparted by spring clip 63, thereby causing carrier 60 and first teeth 68 to co-rotate (rotate in releasably coupled relation with one another). While in their intermeshed, nested relation, rotation of the first teeth 68 causes conjoint rotation of the second teeth 70, thereby rotatably driving worm gear 78 and gear assembly 40, which ultimately drives/actuates cable 22 and causes latch assembly 20 to become cinched. Further, as long as motor 42 is being powered by electrical energy to provide a rotational torque T acting on the nut 54 by engagement with the lead screw 52, even in a stall condition, first and second teeth 68, 70 remain operably intermeshed with one another, thereby preventing a back-driving condition until electrical power supply to motor 42 is interrupted. For example during a stall condition of the clutch assembly as illustratively shown in FIG. 7B, for as long as motor 42 is being powered by supplied electrical energy, lead screw 52 is driven by the motor 42 to provide a rotational torque T acting on the nut 54 by engagement of the nut 54 with the lead screw 52 to urge and maintain end face 64 towards and in engagement with the clutch face 67 but without imparting a corresponding conjoint rotation of the engaged nut 54 and clutch plate 66 due to the clutch plate 66 being restricted or prevented from rotating in the first direction of rotation D1 (D1 is shown in FIG. 7B only to illustrate a direction of rotation when no stall condition would present as in FIG. 7, and it is understood that output shaft 74 would be prevented from rotating during a stall condition), for example as a result of output lever 48 and/or elsewhere in latch assembly 20 being prevented from further actuation or movement as caused by an obstacle encountered during a cinching of the latch assembly 20. An example of latch assembly 20 prevented from further actuation or movement may be as a result of latch assembly having reached a cinched state, thereby preventing a further rotation of clutch plate 66 in the first direction of rotation D1 when the motor 42 is energized.

In FIGS. 8-10C, a power actuator, referred to hereafter as cinch actuator 110, is illustrated in accordance with another aspect of the disclosure, wherein the same reference numerals as used above, offset by a factor of 100, are used to identify like features.

Cinch actuator 110 functions similarly as discussed above for cinch actuator 10, such that cinch actuator 110 is configured in operable communication with latch assembly 20 via a rod or cable, such as a Bowden cable 122, to selectively cinch the latch assembly 20. The cinch actuator 110 includes a clutch assembly 118 that is selectively actuatable to move from a disengaged state to an engaged state in response to electrical current supplied to the motor 142 of the clutch assembly 118, such as via electrical connection of wires 144 to any suitable source of electrical power, as discussed above.

The motor 142 has a motor drive shaft 150 extending along an axis 151 and fixed to a helical drive member, shown as a lead screw 152. Lead screw 152 has one or more helical threads or grooves configured for mating threaded receipt with a corresponding number of helical threads or grooves in a bore of a nut 154. As such, rotation of the lead screw 152 causes linear translation of nut 154 therealong. To facilitate translation of the nut 154 along lead screw 152, the nut 154 has at least one, and shown as a plurality of drive lugs 156 configured for sliding translation with a corresponding number of recessed channels 158 of a carrier 160. The drive lugs 156 are configured for slightly loose receipt within the channels 158 to allow for linear translation therein, though the fit is close in a radial direction to prevent or inhibit relative rotation between the nut 154 and the carrier 160. The carrier 160 is fixed against axial movement, but is permitted for selective rotation, as discussed above for carrier 60. To facilitate selective rotation of carrier 160, a biasing member, shown as a rotary damper member 163, by way of example and without limitation, is disposed having a damper gear member 82 in meshed engagement within a carrier gear member 84, wherein carrier gear member 84 is fixed to carrier 160 for rotation about a rotational axis of carrier 160. It is to be recognized that the biasing force applied by rotary damper 163 against carrier 160 can be precisely controlled via the resistance applied by damper gear member 82 against carrier gear member 84, which can be varied via a spring member, such as a torsion or compression spring member (shown schematically at 86) acting on damper gear member 82. Accordingly, as discussed above with regard to carrier 60, rotation of the carrier 160 can be controlled in response to engagement of an end face 164 of nut 154 with a clutch plate 166 operably coupled to, and shown fixed to an output driven member, such as rotary pulley 148 having cable 122 fixed thereto, by way of example and without limitation. To facilitate selective conjoint driving interaction between end face 164 of nut 154 with an end face, also referred to as clutch face 167 of a clutch plate 166, end face 164 has a plurality of protrusions, also referred to as first teeth 168, configured for meshed driving operable interaction with protrusions, also referred to as second teeth 170, of clutch face 167. A biasing member, such as a springy wave washer 172 (FIG. 9), is disposed between the end face 164 and clutch face 167 of clutch plate 166. The wave washer 172 acts to bias the end face 164 and first teeth 168 of nut 154 axially away from the clutch plate 166 and second teeth 170 thereof while motor 142 is de-energized, wherein the wave washer 172 is axially compressed and at least partially flattened to allow the first and second teeth 68, 70 to be brought into operably engaged and/or driving relation with one another upon motor 142 being energized.

Clutch plate 166 is disposed in a clearance fit on drive shaft 150 for free rotation thereon, such that driving rotation of drive shaft 150 does not cause rotation of clutch plate 166. Likewise, nut 154 is disposed in a clearance fit on drive shaft 150 for free rotation thereon, such that driving rotation of drive shaft 150 does not cause rotation of nut 154.

In use, cinch actuator 110 is operable to move between a disengaged state and an engaged state in automatic response to being de-energized (no electrical current supplied to motor 142) and energized (electrical current supplied to motor 142), respectively, as discussed above for cinch actuator 10. While in the disengaged state, wave washer 172 biases end face 164 and first teeth 168 thereon out of operable coupling with the second teeth 170 of clutch plate 166, and thus, drive nut 154 is biased out of contact from clutch plate 166, thereby automatically back-driving nut 154 without resistance from motor 142 and allowing latch assembly 20 to move to and/or remain in an un-cinched state. Accordingly, when no electrical power is supplied to motor 142, cinch actuator 110 is automatically biased to its disengaged state, wherein first and second teeth 168, 170 are generally free to rotate relative with one another.

When desired to move cinch actuator 110 to its engaged state, electrical power is selectively provided to motor 142 via wires 144, as discussed above for cinch actuator 10, whereupon motor drive shaft 150, and lead screw 152 fixed to drive shaft 150, are rotated. Initial rotation of lead screw 152 causes nut 154 to translate axially along lead screw 152 with drive lugs 156 sliding axially within the recessed channels 158 of carrier 160. Up until the point where first and second teeth 168, 170 are operably intermeshed and coupled for driving engagement with one another, carrier 160 remains fixed against rotation under the bias of rotary damper 163, thus, causing nut 154 to be axially translated along lead screw 152. Then, as the nut 154 translates sufficiently to overcome the bias of wave washer 172, the first and second teeth 168, 170 are operably nested together via being brought into intermeshed and coupled relation with one another, with wave washer 72 being at least partially flattened and axially compressed therebetween. When first and second teeth 168, 170 are operably engaged with one another, nut 154 is prevented from further axial translation, as discussed above for nut 54, whereupon sufficient torque can be applied by drive lugs 156 of nut 154 to carrier 160 to overcome the bias imparted by rotary damper 163, thereby causing carrier 160 and nut 154 to co-rotate with lead screw 152. While in their nested relation, rotation of the first teeth 168 causes conjoint rotation of the second teeth 170 of clutch plate 166, thereby rotatably driving pulley 148, which actuates/translates cable 122 and ultimately causes latch assembly 20 to become cinched. Further, as long as motor 142 is being powered by electrical energy, even in a stall condition, operable engagement of first and second teeth 168, 170 with one another is maintained, thereby preventing a back-driving condition of nut 154 until electrical power supply to motor 142 is interrupted, thereby maintaining latch assembly 20 in the cinched state.

In accordance with a further aspect of the disclosure, a method 1000 for maintaining a latch 20 of a motor vehicle closure panel 12, 14, 16 in a cinched state is provided. The method includes a step 1010 of providing an electric motor 42, 142 having a drive shaft 50, 150 extending along an axis 51, 151 with a screw 52, 152 fixed to the drive shaft 50 150 for rotation about the axis 51, 151 in response to energization of the electric motor 42, 142; a step 1020 of providing a nut 54, 154 having an end face 64, 164 and being configured for selective translation along the screw 52, 152 in response to rotation of the screw 52, 152; a step 1030 of providing a clutch plate 66, 166 having a clutch face 67, 167 and being supported for selective rotation about the axis 51, 151; a step 1040 of providing a biasing member 72, 172 between the nut 54, 154 and the clutch plate 66, 166 to bias the end face 64, 164 out of driving engagement with the clutch face 67, 167; and a step 1050 of providing a carrier member 60, 160 and imparting a torsional bias on the nut 54, 154 via the carrier member 60, 160 sufficient to cause selective relative rotation between the nut 54, 154 and the screw 52, 152 to cause the nut 54, 154 to translate along the screw 52, 152 in response to rotation of the screw 52, 152 when the end face 64, 164 of the nut 54, 154 and the clutch face 67, 167 of the clutch plate 66, 166 are biased out of driving engagement with one another and causing the torsion resistance to be overcome upon the end face 64, 164 of the nut 54, 154 and the clutch face 67, 167 of the clutch plate 66, 166 being brought into driving engagement with one another, whereat the nut 54, 154 and the carrier member 60, 160 rotate conjointly with the screw 52, 152 to bring the latch into a cinched state and maintain the latch in the cinched state.

The method can further include a step 1055 of maintaining the end face 64, 164 of the nut 54, 154 and the clutch face 67, 167 of the clutch plate 66, 166 in driving engagement with one another when the electric motor 42, 142 is energized.

The method can further include a step 1060 of imparting a torsional bias on the carrier member 60, 160 with a rotary dampener member to fix the carrier member 60, 160 and ultimately bias the nut 54, 154 against rotation about the axis 51, 151 with the screw 52, 152 when the end face 64, 164 of the nut 54, 154 and the clutch face 67, 167 of the clutch plate 66, 166 are biased out of driving engagement with one another and overcoming the torsional bias when the end face 64, 164 of the nut 54, 154 and the clutch face 67, 167 of the clutch plate 66, 166 are in driving engagement with one another to cause the carrier member 60, 160 and the nut 54, 154 to rotate about the axis 51, 151 with the screw 52, 152.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power actuator, comprising:

a housing;

an electric motor supported by said housing, said electric motor having a drive shaft extending along an axis with a screw fixed to said drive shaft for rotation about said axis in response to energization of said electric motor;

a clutch plate having a clutch face and being configured for selective rotation;

a nut disposed about said screw, said nut having an end face and being configured for selective translation along said screw in response to rotation of said screw, said nut being caused to translate along said screw in response to rotation of said screw when said end face of said nut and said clutch face of said clutch plate are out of driving relation with one another, said nut being caused to rotate conjointly with said screw upon said end face of said nut and said clutch face of said clutch plate being brought into driving relation with one another; and a driven member operably coupled with said clutch plate when said end face of said nut and said clutch face of said clutch plate are brought into driving relation with one another and when said screw rotates about said axis in response to energization of said electric motor.

2. The power actuator of claim 1, further comprising:

a biasing member imparting a bias between said nut and said clutch plate, said bias tending to space said end face out of driving engagement with said clutch face; and a carrier member supported by said housing in coupled relation with said nut, said carrier member imparting a torsional bias on said nut sufficient to cause selective relative rotation between said nut and said screw to cause said nut to translate along said screw in response to rotation of said screw when said end face of said nut and said clutch face of said clutch plate are biased out of driving relation with one another, said torsional bias being overcome upon said end face of said nut and said clutch face of said clutch plate being brought into driving relation with one another, thereby allowing said nut and said carrier member to rotate conjointly with said screw.

3. The power actuator of claim 2, further including a rotary damper member configured to impart a torsional bias on said carrier member, said torsional bias fixing said carrier member and said nut against rotation with said screw when said end face of said nut and said clutch face of said clutch plate are biased out of driving relation with one another and allowing said carrier member and said nut to rotate with said screw when said end face of said nut and said clutch face of said clutch plate are in driving relation with one another.

4. The power actuator of claim 3, wherein said rotary damper member includes one of a spring member configured to impart a frictional bias on an outer surface of said carrier member, and a damper gear member configured in meshed engagement with a carrier gear member fixed to said carrier member.

5. The power actuator of claim 2, wherein one of said nut and said clutch plate has at least one drive lug and the other of said nut and said clutch plate has at least one recessed channel configured for sliding receipt of said at least one drive lug, said at least one drive lug being configured to translate within said at least one recessed channel when said electric motor is energized and when said end face of said nut and said clutch face of said clutch plate are biased out of driving relation with one another and to prevent relative rotation between said carrier member and said nut when said end face of said nut and said clutch face of said clutch plate are in driving relation with one another.

6. The power actuator of claim 1, wherein said end face of said nut and said clutch face of said clutch plate are maintained in driving relation with one another when electrical energy is supplied to said electric motor.

7. The power actuator of claim 1, wherein said driven member is operably coupled to said clutch plate to be driven in response to rotation of said clutch plate by a gear assembly.

8. The power actuator of claim 7, wherein said clutch plate is fixed to an output shaft having a worm gear configured in meshed engagement with said gear assembly.

9. The power actuator of claim 8, wherein said drive shaft of said electric motor is configured to rotate relative to said output shaft when said end face of said nut and said clutch face of said clutch plate are biased out of driving relation with one another.

10. The power actuator of claim 8, wherein said drive shaft of said electric motor and said output shaft are configured to co-rotate with one another when said end face of said nut and said clutch face of said clutch plate are in driving relation with one another.

11. The power actuator of claim 1, wherein said clutch plate and said driven member are fixed to one another.

12. The power actuator of claim 11, wherein said clutch plate and said driven member are supported by said drive shaft of said electric motor wherein said drive shaft is configured to rotate relative to said clutch plate and said driven member when said end face of said nut and said clutch face of said clutch plate are biased out of driving relation with one another.

13. The power actuator of claim 11, wherein said clutch plate and said driven member are supported by said drive shaft of said electric motor wherein said clutch plate and said driven member are configured to co-rotate with said drive shaft when said end face of said nut and said clutch face of said clutch plate are in driving relation with one another.

14. The power actuator of claim 1, further including at least one of a cable and rod configured to operably couple said driven member with a latch.

15. A clutch assembly, comprising:

a housing;

a screw for rotation about an axis;

a clutch plate having a clutch face and being configured for selective rotation;

a nut disposed about said screw, said nut having an end face and being configured for selective translation along said screw in response to rotation of said screw, said nut being caused to translate along said screw in response to rotation of said screw when said end face of said nut and said clutch face of said clutch plate are out of driving relation with one another, said nut being caused to rotate conjointly with said screw upon said end face of said nut and said clutch face of said clutch plate being brought into driving relation with one another; and a driven member operably coupled with said clutch plate when said end face of said nut and said clutch face of said clutch plate are brought into driving relation with one another and when said screw rotates about said axis.

16. The clutch assembly of claim 15, further comprising:

a biasing member imparting a bias between said nut and said clutch plate, said bias tending to space said end face out of driving engagement with said clutch face; and a carrier member supported by said housing in coupled relation with said nut, said carrier member imparting a torsional bias on said nut sufficient to cause selective relative rotation between said nut and said screw to cause said nut to translate along said screw in response to rotation of said screw when said end face of said nut and said clutch face of said clutch plate are biased out of driving relation with one another, said torsional bias being overcome upon said end face of said nut and said clutch face of said clutch plate being brought into driving relation with one another, thereby allowing said nut and said carrier member to rotate conjointly with said screw.

17. The clutch assembly of claim 16, further including a rotary damper member configured to impart a torsional bias on said carrier member, said torsional bias fixing said carrier member and said nut against rotation with said screw when said end face of said nut and said clutch face of said clutch plate are biased out of driving relation with one another and allowing said carrier member and said nut to rotate with said screw when said end face of said nut and said clutch face of said clutch plate are in driving relation with one another.

18. The power actuator of claim 17, wherein said rotary damper member includes one of a spring member configured to impart a frictional bias on an outer surface of said carrier member, and a damper gear member configured in meshed engagement with a carrier gear member fixed to said carrier member.

19. The clutch assembly of claim 15, wherein said end face of said nut and said clutch face of said clutch plate are maintained in driving relation with one another when the screw is rotated by an electric motor.

20. A power actuator for cinching a vehicle latch, comprising:

an electric motor; and a clutch assembly operable to move between a disengaged state and an engaged state in response to the electric motor being respectively de-energized and energized, wherein a stall condition of the electric motor prevents a backdriving of the clutch assembly to cause the clutch assembly to move from an engaged state to a disengaged state and wherein clutch assembly is automatically moved from the engaged state to the disengaged state upon an interruption of electrical energy to the electric motor.

* * * * *